Patented June 10, 1924.

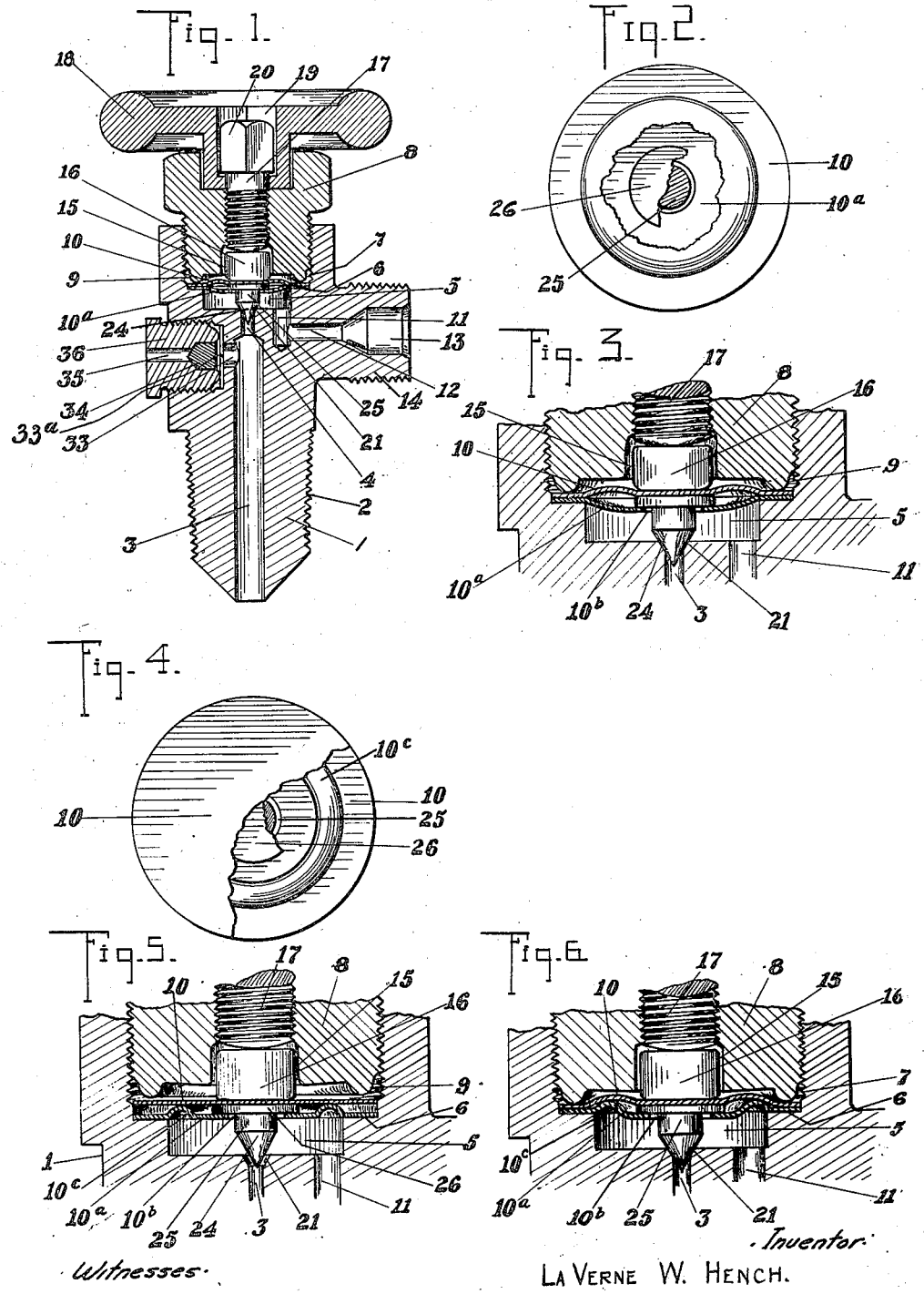

1,497,275

UNITED STATES PATENT OFFICE.

LA VERNE W. HENCH, OF EAST ORANGE, NEW JERSEY.

VALVE.

Application filed July 21, 1921. Serial No. 486,393.

*To all whom it may concern:*

Be it known that I, LA VERNE W. HENCH, a citizen of the United States, and resident of East Orange, in the county of Essex and State of New Jersey, have invented certain new and useful Improvements in Valves (Case B), of which the following is a specification.

My present invention relates to valves of a type adapted for use in connection with fluids, particularly high pressure gases. As disclosed herein the invention is embodied in a valve particularly adapted to serve as a closure for tanks or flasks in which oxygen, hydrogen and other gaseous products may be stored under very high pressure for purposes of transportation, but it is obvious that various features of the invention may be embodied in valves of specifically different construction, intended for other or different purposes.

As employed on ordinary tanks for compressed oxygen, air, hydrogen, etc., the valve must be of great strength and simple rugged construction in order to serve the function of a safe closure for the tank during considerable periods and yet be surely operative for use as the inlet valve for initially charging the tank, as well as for use as the discharge valve controlling regulated outlet of the gas at reduced rates and pressures such as may be required for the various commercial purposes for which such gases are employed. Another important feature of valves of this type is to provide a safe and reliable packing between the valve proper and the mechanism for operating the same.

In commercial practice the above characteristics have been sought by constructions involving the use of an elastic metal diaphragm, clamped gas-tight against an annular seat by a massive screw plug, the operating means being wholly on one side (the outer side) of the diaphragm while the inlet and outlet passages for the gas are both in communication with the cavity on the opposite side of the diaphragm, the central portion of the diaphragm serving as the closing valve by screwing it against an annular seat surrounding the passage which communicates with the interior of the tank.

Such constructions have several disadvantages with respect to the edge-clamping means for the diaphragm and with respect to the annular surface which forms the valve seat for the inner face of the diaphragm. This surface, if made of ample area, must be very accurately trued and there must be no substantial unevenness of the diaphragm or otherwise the available pressure per unit area being small the seating will be imperfect. If the annular seating surface is made of small area as by making it rounded, ribbed or V-shaped in cross section, the pressure per unit area of contacting surface must be very great, and repeated opening and closing of the valve, will be sufficient to cut into or mar the diaphragm or the seat or both.

In either case and however constructed, any particles of grit or dirt or even relatively soft materials, or products of chemical reaction of gas or water with the metal in the valve seat or diaphragm are very troublesome causes of failure of the diaphragm to seat perfectly even under the extreme pressures that may be applied by the powerful screw provided for the purpose. Such failures are likely to occur where a tank is used only intermitently and at long intervals and when the valve does fail to seat properly the result is leakage and loss of whatever gas there is in the tank and very likely also danger or damage to property or persons which may be caused by the escaping gas.

To meet these conditions and afford a remedy therefor, my invention contemplates limiting the function of the diaphragm to that of an imperforate gas-tight means for transmitting motion and pressure from the exterior operating screw to the interior cavity and employing in combination therewith, a separate valve element of the cone or needle valve type, located entirely within the sealed-in valve cavity. One feature of this combination is making the cone end of the valve of proper taper, and the valve as a whole, of sufficiently broad base and small altitude so that it must be automatically self-aligning and self-centering under pressure applied through the base. The base is in position to be engaged by the diaphragm for forcing to position, and when the diaphragm is in retracted position, the arrangement, proportions and sizes will be such that the valve element cannot become cocked or fall out of position when the closing pressure is relieved and the diaphragm moves back to its normal or open-valve position. Preferably the valve element is loosely secured so that the valve can shift laterally the slight distance necessary to make it self-centering on its seat, without the necessity for accurately centering the diaphragm itself with respect to said seat. Preferably also the base of the valve element is secured in operative relation to the sealing diaphragm by means of a retracting diaphragm which by its own resilience retracts and holds open the valve during the charging operation. This diaphragm has a central perforation through which the stem of the valve projects and it fits said stem with such looseness as may be necessary to permit the desired automatic centering and aligning of the latter with respect to the valve seat.

The enormous pressure applicable through the operating screw may cause the valve cone to function more or less as a mandrel adapted to crush out of the way or into the metal of the seat any and all foreign matter, and it may even serve to some extent as a valve-reseating tool with respect to unevennesses or projections of the metal of the valve seat. For such purposes I prefer a cone having an apex angle of about 90° so as to afford a powerful wedging effect for the purpose described, combined with quick clearance of the valve surface with respect to the valve seat in response to pressure applied endwise of the cone. In certain cases, however, the pitch of the cone may be increased so as to give an apex angle as sharp as 60°, as shown in the drawing, and still be well within the limits of practicability.

As above indicated the use of a cone or needle valve requires a greater lift for the diaphragm for a given desired outlet area than does a flat valve surface such as would be afforded by the diaphragm itself, and in general the sharper the cone the greater the required lift. Hence, the stress on the center of the diaphragm is likely to be greater than so small a diaphragm can stand. For this reason I preferably provide between the clamped periphery and the central valve-engaging portion of the diaphragm, one or more annular corrugations adapted to afford a greater range of easy resilient movement for the center of the diaphragm.

The above and other features of my invention may be more fully understood from the following description in connection with the accompanying drawings in which:—

Figure 1 is a vertical central section of a valve of the peculiar type above referred to having my invention embodied therein;

Figures 2 and 4 are top plan views showing two forms of diaphragms arranged for securing and retracting the valve.

Figures 3, 5 and 6 are enlarged sectional details showing respectively the diaphragm of Figures 2 and 4 in operative position with the device.

As shown in these drawings, the valve comprises a body portion 1 having an exterior tapered screw-thread 2, adapted to be screwed into a tank or other conduit to be controlled by the valve. The body portion is formed with a central passage 3 communicating at its upper end through a reduced passage 4 with a cylindrical cavity 5 above which is an annular seat 6 of somewhat larger diameter and above this is a screw threaded recess 7 containing screw bushing 8 formed on its lower end with the annular bead 9 adapted to engage and clamp diaphragm 10 upon seat 6, on a circle which is well within the periphery of said diaphragm. The diaphragm thus affords an imperforate gas-tight closure for the cavity or chamber 5. From this chamber leads the outlet passage through 11, 12, 13, the latter being enlarged and located in the projecting nipple 14 which is exteriorly screw threaded for attachment in any desired connection through which the fluid is to be charged or discharged. Interiorly the bushing 8 is formed with a cavity 15 in which is loosely fitted a plug 16 serving as a sort of combined swivel and wear piece through which screw 17 may apply pressure evenly over a wide area of the diaphragm 10, through a small area, small-friction contact of the rounded end of said screw 17. A convenient means for operating screw 17 is a hand-wheel 18 which may be formed with a wrench socket 19 engaging the squared head 20.

As shown in all figures, the upper end of passage 4 is formed with a cone seat 21 in which fits a correspondingly pitched valve cone 24, which is preferably integral with a cylindrical shank 25 and a broad base-piece 26 which engages with the center of diaphragm 10.

In this connection it is to be noted that the valve function is performed by a portion of the cone surface that is well away from the tip of the cone. Hence so far as concerns stability and self-aligning tendency of the valve under the final thrust of the same, the effective base for the thrust is really considerably greater than the altitude through which the thrust takes effect.

While a suitably shaped valve having a base that is wide enough with respect to its altitude may be self-centering and may be relied upon to open and close satisfactorily so far as concerns outlet of compressed gases from passage 3, such construction is not so well adapted for fully and certainly opening and staying open while the tank is being charged through passage 13. For this reason I prefer to employ a retracting diaphragm 10ᵃ below said imperforate diaphragm 10 so that the resilience of the diaphragm 10ª as well as the gas pressure applied within the cavity 5, may be available as means for positively withdrawing the valve from its seat when the pressure from screw 17 is released. The head of the valve is located between the two diaphragms, the shank of the valve projecting through the annular opening 10ᵇ in the center of said retracting diaphragm. The hole 10ᵇ is enough larger than the valve shank so as to afford ample lateral play of the valve for automatic self-alignment with its valve seat. For the same reason one or the other or both of the diaphragms are preferably dished or corrugated so that the valve head will not be pinched between them to an extent which might interfere with the lateral movement and self-adjustment for purposes of alignment.

In Figures 1, 2 and 3 the imperforate diaphragm is shown as dished or corrugated in such a way as to serve the double purpose of affording space for the valve head and also increasing the range of movement of the center of the valve without imposing undue stress thereon. The lower diaphragm 10ª is oppositely dished. Obviously the lower diaphragm is the resilent retracting means for withdrawing the valve when the pressure of the operating screw is relieved.

In Figures 4 and 5 the upper diaphragm is formed flat and the lower diaphragm is formed with an up-curving, annular bead, or corrugation, 10ᶜ which affords all of the space required for free play of the valve head. Figure 5 shows the initial shape of these diaphragms before clamping, while Figure 6 shows them clamped and with the valve forced to the closed position.

When used for its preferred purpose as a valve for flasks or tanks in which gases are stored under very high pressure, the valve is preferably supplied with a safety vent through passage 33 normally closed by frangible diaphragm 33ª. In the rear of the diaphragm is a fusible plug 34 closing outlet passage 35 to the outer air. The fusible plug and the passage are formed in a bushing 36, which also serves as the clamp for the frangible diaphragm 33ª.

I claim:—

1. A valve of the class described, formed with a valve chamber, an imperforate diaphragm closure for one side of said chamber; and, on the outer side of said diaphragm, a screw bushing for clamping the outer portion of said diaphragm in position of hermetically seal said valve chamber against escape of fluid and means extending through said bushing for forcibly flexing said diaphragm; and, on the other, sealed-in side of said diaphragm, inlet and outlet passages both communicating with said valve chamber and one of them being centrally located and opening directly opposite the central portion of said diaphragm, in combination with a cone valve element located within said valve chamber having a base portion in operative relation to the movable central portion of the diaphragm and its cone portion adapted to engage said centrally located opening together with a separate resilient member for retracting and holding open said valve by its own resilience independently of gas pressure thereon.

2. In the combination specified by claim 1, the further feature of a supplemental perforated diaphragm surrounding the shank of the valve as the resilient means for retracting the valve.

3. In the combination specified by claim 2 the further feature of having the valve shank project loosely through the perforated diaphragm to permit bodily lateral movement for automatic self-alignment of the valve with respect to the valve seat.

4. In the combination specified by claim 3 the further feature of having the diaphragms formed with flat central portions spaced apart to loosely hold the base of the valve in approximate registry with the valve seat.

Signed at New York, in the county of New York, and State of New York, this 20th day of December, A. D. 1920.

LA VERNE W. HENCH.